(12) United States Patent
Barkac et al.

(10) Patent No.: US 6,699,942 B2
(45) Date of Patent: Mar. 2, 2004

(54) POWDER COATING COMPOSITIONS DEMONSTRATING IMPROVED MAR RESISTANCE

(75) Inventors: Karen A. Barkac, Murrysville, PA (US); Karen S. Rechenberg, Gibsonia, PA (US); Masayuki Nakajima, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/952,699

(22) Filed: Sep. 14, 2001

(65) Prior Publication Data

US 2003/0055168 A1 Mar. 20, 2003

(51) Int. Cl.[7] ............................................ C08L 37/00
(52) U.S. Cl. .................... 525/327.3; 525/123; 525/375; 523/410; 523/415
(58) Field of Search ................ 523/410, 415; 525/123, 327.3, 375

(56) References Cited

U.S. PATENT DOCUMENTS

| 4,801,680 A | 1/1989 | Geary et al. ................ 528/272 |
| 5,084,541 A | 1/1992 | Jacobs, III et al. ........... 528/45 |
| 5,407,707 A | 4/1995 | Simeone et al. ............. 427/410 |
| 5,891,981 A | 4/1999 | Mauer et al. .................. 528/45 |
| 6,342,274 B1 * | 1/2002 | Schwarte et al. ............ 427/485 |
| 6,344,501 B1 * | 2/2002 | Sierakowski et al. ....... 523/410 |
| 6,358,568 B1 * | 3/2002 | Schwarte et al. ............ 427/484 |
| 6,512,026 B1 * | 1/2003 | Ott et al. ..................... 523/409 |

FOREIGN PATENT DOCUMENTS

| DE | 19744561 A1 | | 10/1997 |
| DE | 10027293 A1 | | 8/2000 |
| WO | WO-99/15593 | * | 4/1999 |
| WO | WO-99/15598 | * | 4/1999 |
| WO | WO-99/50359 | * | 7/1999 |

* cited by examiner

Primary Examiner—D. R. Wilson
(74) Attorney, Agent, or Firm—William J. Uhl; Jacques B. Miles

(57) ABSTRACT

A curable powder coating composition is disclosed comprising a film-forming polymer having reactive functional groups, a curing agent having functional groups reactive with the functional groups of the polymer, the curing agent being present in an amount sufficient to cure the coating composition, and a tricarbamoyl triazine compound. The curable powder coating composition has improved mar resistance properties.

6 Claims, No Drawings

POWDER COATING COMPOSITIONS DEMONSTRATING IMPROVED MAR RESISTANCE

FIELD OF THE INVENTION

The present invention relates to powder coating compositions, particularly powder coating compositions with improved mar resistance properties.

BACKGROUND

Solid particulate coating formulations referred to in the industry as "powder coatings" can be applied over various substrates. A major benefit of powder coatings is that little, if any, volatile material is given off to the surrounding environment when powder coatings are cured. Due to increasing restrictions on volatile organic content (VOC), powder coatings are preferred for many applications.

One problem with conventional powder coatings is that they exhibit poor mar resistance properties. "Mar resistance" refers to the ability of a coating composition to maintain its appearance when the coating comes in contact with an abrasive material.

To improve mar resistance, microparticulate materials such as silica, metal sulfides, and crosslinked styrene-butadiene are sometimes added to powder coating compositions. Because the addition of microparticulate materials adversely affects the gloss and the distinctness of image (DOI) of a coated surface, this is a less than ideal solution to the problem.

The present invention provides a curable powder coating composition which exhibits improved mar resistance properties.

SUMMARY OF THE INVENTION

The present invention is a curable powder coating composition comprising a polymer containing reactive functional groups, a curing agent having functional groups reactive with the functional groups of said polymer, the curing agent being present in an amount sufficient to cure said polymer, and less than 10 percent based on total resin solids of the powder coating composition of a tricarbamoyl triazine compound represented by the following chemical formula: $C_3N_3(NRCOXY)_3$ where Y is an alkyl group or substituted alkyl group having 1 to 12 carbon atoms, X is NR', O, S, PR', and —C—, and R and R' are hydrogen and alkyl or a substituted alkyl having 1 to 12 carbon atoms.

DETAILED DESCRIPTION OF THE INVENTION

Various numerical ranges are disclosed in this patent application. Because these ranges are continuous, they include every value between the minimum and maximum values. Unless expressly indicated otherwise, the various numerical ranges specified in this application are approximations. It is implied that the minimum and maximum values within the stated ranges are preceded by the word "about". Therefore, slight variations above and below the stated ranges can be used to achieve substantially the same results.

The powder coating composition of the present invention comprises a polymer having reactive functional groups. The polymer having reactive functional groups can be chosen from a variety of materials, including but not limited to, acrylic polymers, polyurethane polymers, and polyester polymers. The reactive functional groups on the polymer are selected from carboxylic acid, epoxy, hydroxyl, amino, carbamate, and urea. The polymer is present in the powder coating composition in amounts ranging from about 10 to 90 percent by weight, based on the total weight of resin solids in the powder coating composition.

In an embodiment of the invention, the polymer having reactive functional groups is an acrylic polymer. Acrylic polymers containing the appropriate functional groups can be formed by reacting polymerizable alpha, beta-ethylenically unsaturated monomers containing the functional groups mentioned above with one or more other polymerizable, unsaturated monomers.

Suitable carboxylic acid group-containing monomers include acrylic acid, methacrylic acid, crotonic acid, itaconic acid, fumaric acid, maleic acid, citraconic acid, and monoalkylesters of unsaturated dicarboxylic acids. Acrylic acid and methacrylic acid are the preferred carboxylic acids.

Suitable epoxy group-containing monomers include glycidyl acrylate and glycidyl methacrylate.

Suitable amino group-containing monomers include aminoethyl methacrylate and aminopropyl methacrylic.

Pendant carbamate functional groups can be incorporated into the acrylic polymer by copolymerizing the acrylic monomers with a carbamate functional vinyl monomer. Examples of suitable carbamate functional monomers include: (a) carbamate functional alkyl esters of methacrylic acid; (b) the reaction product of hydroxyethyl methacrylate, isophorone diisocyanate, and hydroxypropyl carbamate; (c) the reaction product of hydroxypropyl methacrylate, isophorone diisocyanate, and methanol; and (d) the reaction product of isocyanic acid with a hydroxyl functional acrylic or methacrylic monomer like hydroxyethyl acrylate.

Pendant urea groups can be incorporated into the acrylic polymer by copolymerizing the acrylic monomers with urea functional vinyl monomers. Examples of urea functional monomers include: (a) urea functional alkyl esters of acrylic acid or methacrylic acid and (b) the reaction product of hydroxyethyl methacrylate, isophorone diisocyanate, and hydroxyethyl ethylene urea.

The acrylic polymers typically have number average molecular weights of about 1,000 to 10,000 or 1,000 to 5,500 based on gel permeation chromatography using a polystyrene standard. The acrylic polymers have equivalent weights (based on the functional groups mentioned above) of about 200 to 400 or 250 to 355 gram/equivalent. The glass transition temperature (T(g)) of the polymer is typically about 30° C. to 60° C. or 35° C. to 55° C. The T(g) is determined by Differential Scanning Calorimetry (DSC) at a rate of heating equal to 18° F. (10° C.) per minute.

In another embodiment of the present invention, the polymer having reactive functional groups is a polyurethane polymer containing the functional groups mentioned above for the acrylic polymers. Polyurethane polymers can be prepared by reacting polyols and polyisocyanates. Examples of suitable polyols include low molecular weight aliphatic polyols such as ethylene glycol, propylene glycol, butylene glycol, 1,6-hexylene glycol, neopentyl glycol, cyclohexanedimethanol, trimethylolpropane and the like. Typically, high molecular weight polymeric polyols such as polyether polyols and polyester polyols are used with the lower molecular weight polyols. Examples of polyether polyols are those formed from the oxyalkylation of various polyols like glycols or higher polyols. Suitable glycols include ethylene glycol, 1,6-hexanediol, and Bisphenol A. Suitable higher polyols include trimethylol propane and pentaerythritol. Suitable polyester polyols can be prepared by the polyesterification of organic polycarboxylic acids or anhydrides thereof with organic polyols. Usually, the polycarboxylic acids and polyols are aliphatic or aromatic dibasic acids and diols.

Suitable polyisocyanates include aromatic and aliphatic polyisocyanates. Aliphatic polyisocyanates are preferred because of their exterior durability. Exemplary polyisocyanates include 1,6-hexamethylene diisocyanate, isophorone diisocyanate and 4,4'-methylene-bis-(cyclohexyl isocyanate).

Carboxylic acid functionality can be introduced into the polyurethane by reacting the polyurethane polyol with polycarboxylic acids. Exemplary polycarboxylic acids include succinic acid, adipic acid, azelaic acid, sebacic acid, terephthalic acid, isophthalic acid, tetrahydrophthalic acid, hexahydrophthalic acid, trimellitic acid and anhydrides of such acids. Alternatively, the polyisocyanate can be reacted with a mixture of the polyols mentioned above and a polyol containing carboxylic acid groups such as dimethylol propionic acid.

Hydroxyl functionality can be introduced into the polyurethane by reacting the polyisocyanate with a stoichiometric excess of the polyol component to form a polyurethane polyol.

Epoxy functionality can be incorporated into the polyurethane by including a hydroxy functional epoxy compound like glycidol with the polyol component.

Amino functionality can be introduced into the polyurethane by including a polyamine in the monomer charge. Suitable amines include primary and secondary diamines and polyamines in which the radicals attached to the nitrogen atoms are saturated, aliphatic, alicyclic, aromatic, aromatic-substituted aliphatic, aliphatic-substituted aromatic, or heterocyclic.

Pendant carbamate groups can be incorporated into the polyurethane by forming a hydroxyalkyl carbamate which can be reacted with the polyacids or polyols used to form the polyurethane.

Pendant urea groups can be introduced into the polyurethane by reacting a hydroxyl functional urea such as hydroxyalkyl ethylene urea with the polyacids and polyols used to form the polyurethane. Also, isocyanate terminated polyurethane can be reacted with primary amines, aminoalkyl ethylene urea, or hydroxyalkyl ethylene urea to yield a material with pendant urea groups.

The polyurethane polymers typically have number average molecular weights of about 3,000 to 25,000 or 5,000 to 10,000 based on gel permeation chromatography using a polystyrene standard. The polyurethane polymers have equivalent weights (based on the functional groups mentioned above) of about 280 to 2,805 or 1,122 to 1,870 gram/equivalent. The T(g) of the polymer is typically about 35° C. to 85° C. or 45° C. to 60° C.

In another embodiment of the invention, the polymer having reactive groups is a polyester polymer having the functional groups mentioned above. Polyester polymers are based on a condensation reaction of low molecular weight aliphatic polyols, including cycloaliphatic polyols, with aliphatic and/or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylol propane, and the like. Polymeric polyols such as the polyether polyols mentioned above can be used in combination with the low molecular weight polyols. Examples of suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid and anhydrides of such acids.

Carboxylic acid functionality can be introduced into the polyester by reacting a stoichiometric excess of the polycarboxylic acid with the polyol.

Hydroxyl functionality can be incorporated into the polyester by reacting a stoichiometric excess of the polyol component with the polycarboxylic acid.

Epoxy groups can be introduced into the polyester by including an epoxy functional compound such as glycidol with the polyol component.

Amino groups can be introduced into the polyester by including an amino alcohol such as amino ethanol or amino propanol with the polyol component.

Pendant carbamate groups can be introduced into the polyester by forming a hydroxyalkyl carbamate which can be reacted with the polyacids or polyols used to form the polyester.

Pendant urea groups can be introduced into the polyurethane by reacting a hydroxyl functional urea such as hydroxyalkyl ethylene urea with the polyacids and polyols used to form the polyester. Also, polyester prepolymers can be reacted with primary amines, aminoalkyl ethylene urea, or hydroxyalkyl ethylene urea to yield a material with pendant urea groups.

The polyester polymers typically have number average molecular weights of about 3,000 to 35,000 or 5,000 to 10,000 based on gel permeation chromatography using a polystyrene standard. The polyester polymers have equivalent weights (based on the functional groups mentioned above) of about 280 to 2,805 or 122 to 1,870 gram/equivalent. The T(g) of the polymer is typically about 25° C. to 85° C. or 50° C., to 70° C.

The powder coating composition of the present invention also comprises a curing agent having functional groups that are reactive with the functional groups of the polymer described above. Suitable curing agents include polyepoxides, beta-hydroxyalkylamides, polyacids, aminoplast, and blocked polyisocyanates.

Polyepoxides are suitable curing agents for polymers having carboxylic acid groups and amine. Examples of suitable polyepoxides include those described in U.S. Pat. No. 4,681,811 at column 5, lines 33 to 58, incorporated herein by reference.

Beta-hydroxyalkylamides are suitable curing agents for polymers having carboxylic acid groups. Examples of suitable beta-hydroxyalkylamides include those described in U.S. Pat. No. 4,801,680 at column 2, line 42 to column 3, line 9, incorporated herein by reference.

Polyacids, particularly polycarboxylic acids, are good curing agents for polymers having epoxy functional groups. Examples of suitable polycarboxylic acids include those described in U.S. Pat. No. 5,407,707 at column 3, line 55 to column 4, line 10, incorporated herein by reference.

Aminoplast and phenoplast curing agents are suitable curing agents for polymers having hydroxyl, carboxylic acid, carbamate and urea functional groups. Examples of suitable aminoplast include alkylated methylol melamine and alkylated methylol urea.

Blocked polyisocyanates and polyisocyanurate are suitable curing agents for polymers having hydroxyl and amino groups. Examples of suitable blocked polyisocyanates include benzene triisocyanate, polymethylene isocyanate, 1,4-tetramethylene diisocyanate, 1,6-hexamethylene diisocyanate, 4,4'-diphenylmethane diisocyanate, 1,3-phenylene diisocyanate, 1,4-phenylene diisocyanate, toluene diisocyanateo, 1,4-cyclohexyl diisocyanate, isophorone diisocyanate, and 4,4'-methylene-bis(cyclohexyl isocyanate).

The curing agent must be present in an amount sufficient to cure the powder coating composition of the present invention. Typically, the curing agent is present in the powder coating composition in an amount ranging from about 10 to 90 weight percent or from 25 to 75 weight percent, said weight percentages based on the total weight of resin solids in the powder coating composition.

The powder coating composition of the present invention also comprises a tricarbamoyl triazine compound represented by the following chemical formula: $C_3N_3(NRCOXY)_3$ where Y is an alkyl group or substituted alkyl group having 1 to 12 carbon atoms, X is NR', O, S, PR', and R and R' are hydrogen and alkyl or a substituted alkyl having 1 to 12 carbon atoms. Examples of suitable substitution groups for the substituted alkyl include ether, ester, amide, acid, epoxy, urethane, urea, hydroxyl (preferred substituent), thiol, silyl (alkoxysilane) group, and cyano group.

When X is O, Y is preferably an alkyl group or a substituted alkyl group having 6 to 12, more preferably 6 to 8 carbon atoms.

When X is NR', Y is preferably an alkyl group or a substituted alkyl group having 1 to 6 more preferably 2 to 4 carbon atoms.

Tricarbamoyl triazine compounds and methods of preparing them are described in U.S. Pat. No. 5,084,541, incorporated herein by reference.

It is significant that the present invention is limited to tricarbamoyl triazine compounds having the following chemical formula: $C_3N_3(NRCOXY)_3$ where Y is ax alkyl group or substituted alkyl group having 1 to 12 carbon atoms, X is NR', O, S, or PR', and R and R' are hydrogen and alkyl or a substituted alkyl having 1 to 12 carbon atoms. Typically, tricarbamoyl triazine compounds are not compatible with powder systems. However, up to 10 percent of the disclosed tricarbamoyl triazine compound based on the total weight of resin solids in the powder coating composition can be loaded into the powder composition without crashing the system. The tricarbamoyl triazine compound is present in the powder coating composition in amounts of up to 10 percent by weight or from about 2 to 8 percent by weight or about 4 to 8 percent by weight, based on total weight of resin solids in the curable composition.

Optimally, the powder coating composition of the present invention can also include the following materials which are all well known in the art: pigments, fillers, light stabilizers, anti-oxidants, flow control agents, anti-popping agents, and catalyst.

The powder coating composition of the present invention is formed by melt blending the above-mentioned components. The melt blending process proceeds as follows. Initially, all of the components are blended in a high shear mixer such as a Henschel Blender. Then, the blended components are melt blended in an extruder at a temperature between 80° C. and 130° C. Next, the extrudate is cooled. Lastly, the cooled extrudate is pulverized into a particulate blend and ground to a particle size of 17 to 27 microns using a grinding mill such as an Air Classifying Mill ACM II available from Micron Powder Systems.

The powder coating composition of the present invention can be applied directly to a substrate such as wood, plastic, steel and aluminum. The finished powders can be electrostatically sprayed onto test panels and evaluated for coating properties.

The powder coating composition of the present invention exhibits improved mar resistance properties in comparison to conventional powder coatings.

EXAMPLES

The present invention is illustrated by the following non-limiting examples. Various powder coating compositions were prepared for purposes of testing. The various powder coating compositions are denoted as Examples A through G. Example A is a conventional powder coating composition. Examples B, D, and F are powder coating compositions according to the present invention. They contain different amounts of the disclosed tricarbamoyl triazine compound. Examples C, E, and G are comparative examples.

Specific information on the make up of powder coating compositions A through G is contained in Table 1.

Table 2 contains information related to mar resistance and gassing.

Powder Coating Compostions

Table 1 below provides a list of the ingredients used to formulate the various powder coating compositions used in the Examples. All of the quantities expressed in Table 1 are in grams.

TABLE 1

| Ingredient | Example A | Example B | Example C (Comparative) | Example D | Example E (Comparative) | Example F | Example G (Comparative) |
| --- | --- | --- | --- | --- | --- | --- | --- |
| GMA Functional Acrylic[1] | 69.05 | 65.29 | 61.53 | 62.08 | 59.06 | 62.68 | 59.06 |
| DDDA[2] | 22.68 | 21.44 | 20.2 | 20.58 | 19.39 | 20.58 | 19.39 |
| Acrylic Flow Add[3] | 1.1 | 1.1 | 1.1 | 1.1 | 1.1 | 1.1 | 1.1 |
| Benzoin | 0.2 | 0.2 | 0.2 | 0.2 | 0.2 | 0.2 | 0.2 |
| Microwax C[4] | 0.6 | 0.6 | 0.6 | 0.6 | 0.6 | 0.6 | 0.6 |
| Tinuvin 144[5] | 2 | 2 | 2 | 2 | 2 | 2 | 2 |
| CGL-1545[6] | 2 | 2 | 2 | 2 | 2 | 2 | 2 |
| HCA-1[7] | 2 | 2 | 2 | 2 | 2 | 2 | 2 |
| ARMEEN M2C[8] | 0.37 | 0.37 | 0.37 | 0.37 | 0.37 | 0.37 | 0.37 |
| TACT[9] | 0 | 5 | 10 | 0 | 0 | 0 | 0 |

TABLE 1-continued

| Ingredient | Example A | Example B | Example C (Comparative) | Example D | Example E (Comparative) | Example F | Example G (Comparative) |
|---|---|---|---|---|---|---|---|
| TACT modified with hydroxy ethyl carbamate[10] | 0 | 0 | 0 | 5 | 10 | 0 | 0 |
| TACT modified with dibutyl amine[11] | 0 | 0 | 0 | 0 | 0 | 5 | 10 |

[1]GMA Functional Acrylic is comprised of 50% Glycidal Methacrylate, 10% Butyl Methacrylate, % Styrene, and 35% Methyl Methacrylate, by weight.
[2]Dodecanedioic Acid
[3]Acrylic Flow Additive was prepared by solution polymerization in xylene and toluene of the following monomers: 81.2% 2-ethyl hexyl acrylate, 11.8% hydroxyl ethyl acrylate, and 7% N,N-dimethylaminoethyl methacrylate. The polymerization was at reflux temperature in the presence of VAZO 67 (2,2'-Azobis-2-methylbutyronitrile)). The acrylic flow agent was vacuum stripped to 100% solids.
[4]A fatty acid amide (ethylene bis-stearoylamide) that is sold by Hoechst-Celanese Corporation.
[5]TINUVIN 144 (2-tert-butyl-2-(4-hydroxy-3,5-di-tert-butylbenzyl) [bis(methyl-2,2,6,6,-tetramethyl-4-piperidinyl)] dipropionate) is an ultraviolet light stabilizer sold by Ciba-Geigy Corp.
[6]CGL-1545 (2-[4((2-Hydroxy-3-(2-ethylhexyloxy)propyl)-oxy]-2-hydroxyphenyl-4,6-bis(2,4-dimethylphenyl)-1,3,5-triazine) is an ultraviolet light stabilizer sold by Ciba-Geigy Corp.
[7]HCA-1 is an anti-yellowing agent sold by Sanko Chemical Corp.
[8]ARMEEN M2C is a methyl dicocoamine sold by Akzo-Nobel Corp.
[9]TACT is a mixture of 2,4,6-tris(methyl carbamate)-1,3,5-triazine and 2,4,6-tris(n-butyl carbamate)-1,3,5-triazine which is supplied as an n-butanol solution. US Pat. No. 5,084,541 describes how TACT is made and used.
[10]TACT modified with hydroxy ethyl carbamate is a product of the reaction between TACT and 2-hydroxyethyl carbamate.
[11]TACT modified with dibutyl amine is a product of the reaction between TACT and n-butylamine.

Coated Substrates

Coated substrates were prepared using the powder compositions of Examples A through G. The coated substrates were prepared in the following manner. Panels were coated with ED5000, an electrocoat primer commercially available from PPG Industries, Inc. Then, a layer of Akzo Black Primer commercially available from Akzo Corporation and a layer of BASF Black II Waterborne Basecoat commercially available from BASF Corporation were spray applied on the panel to achieve a film thickness of about 1.1 mils (27.9 microns) and 0.47 mils (12 microns), respectively. Next, the primed panels were cured at a bake schedule of 25 minutes at 311° F. (155° C.), basecoated and flash baked for 10 minutes at 176° F. (80° C.). Lastly, the exemplary powder clearcoat compositions were electrostatically applied to the panels and cured for 30 minutes at 293° F. (145° C.). The applied film thickness of the powder clearcoat was between 2.7 and 3.5 mils (68.6 to 88.9 microns). The coated substrates were evaluated for mar resistance and gassing.

Table 2 contains data reflecting the gassing and mar resistance properties of the coated panels. The mar resistance value used for analytical purposes is the average of the mar resistance determined using an Atlas Mar Tester with Bon Ami Cleanser and the mar resistance determined using an Atlas Mar Tester with $2\mu$ 3M Abrasive Paper.

To calculate mar resistance using the Atlas Mar Tester with Bon Ami Cleanser, a light coating of Bon Ami cleanser was applied to each of the test panels. Excess cleanser was shaken off. A set of ten double rubs was then run on each panel using a felt cloth clamped to the acrylic finger on the arm of the instrument. Two more sets of ten double rubs were done for a total of three mar stripes per panel. Next, the panel was washed with cool tap water and dried. Mar Resistance which equals the Marred Gloss divided by the Original Gloss multiplied by 100 was expressed as the percentage of the 20° Gloss retained after the surface is marred by the mar tester.

To calculate mar resistance using the Atlas Mar Tester with $2\mu$ 3M Abrasive Paper, a 2 inch by 2 inch piece of the $2\mu$ abrasive paper was placed over the felt cloth and clamped to the acrylic finger on the arm of the instrument. Then, a set of ten double rubs was run on each panel. Two more sets of ten double rubs were done for a total of three mar stripes per panel. Next, the panel was washed with cool tap water and dried. Mar Resistance which equals the Marred Gloss divided by the Original Gloss multiplied by 100 was expressed as the percentage of the 20° Gloss retained after the surface is marred by the mar tester.

Table 2 contains comparative information on the mar resistance of the exemplary coating compositions. Example A was the control.

Gassing refers to holes in the film which result because entrapped air and other volatiles are trying to escape through the clearcoat layer during cure. Gassing of the panels was rated on a scale of 0 to 3 by visual inspection.

TABLE 2

|  | Gassing | 20° Gloss | Mar Resistance |
|---|---|---|---|
| Example A | 0 | 84 | = |
| Example B | 2 | 84 | + |
| Example C | 3 | 41 | ++ |
| Example D | 0 | 82 | + |
| Example F | 1 | 67 | ++ |
| Example F | 0 | 85 | + |
| Example G | 2 | 84 | ++ |

The following is a description of the numbers and symbols that appear in Table 2 below:
For gassing,
"0" indicates no Gassing;
"1" indicates slight Gassing;
"2" indicates moderate Gassing; and
"3" indicates severe Gassing
For mar resistance,
"=" indicates the mar resistance was equal to the control;
"+" indicates there was some degree of improvement in mar resistance over the control; and
"++" indicates there was a significant degree of improvement in mar resistance over the control.

Conclusion

As shown in Table 2 above, the powder coating compositions of the present invention demonstrated improved mar resistance properties and minimal gassing. Because powder coating compositions according to the present invention exhibit minimal gassing, panels coated with the inventive compositions have superior appearance properties.

What is claimed is:

1. A curable powder coating composition comprising:
   a. a copolymer including glycidyl methacrylate, butyl methacrylate, styrene and methyl methacrylate;
   b. dodecanedioic acid; and
   c. a reaction product of hydroxyethyl carbamate and a mixture of 2.4.6-tris(methyl carbamate)-1,3,5-triazine and 2,4,6-tris(n-butyl carbamate)-1,3,5-triazine.

2. A curable powder coating composition according to claim 1 wherein the ratio of said copolymer to dodecanoic acid is 1:9 to 9:1 by weight.

3. A curable powder coating composition according to claim 1 wherein said reaction product compound is present from 5.3 to 5.7 percent by weight, based on the total weight of components (a), (b), and (c), in the powder coating composition.

4. A curable powder coating composition according to claim 1 wherein the copolymer has a number average molecular weight of about 1,000 to 10,000.

5. A curable powder coating composition according to claim 1 wherein the copolymer has an equivalent weight of about 200 to 400.

6. A curable powder coating composition according to claim 1 wherein the copolymer has a glass transition temperature from about 30° C. to 60° C.

* * * * *